(12) United States Patent
Kutschenreuter et al.

(10) Patent No.: US 7,881,212 B2
(45) Date of Patent: Feb. 1, 2011

(54) METHOD FOR DETERMINING A ROUTE DISTANCE VALUE

(75) Inventors: Matthias Kutschenreuter, München (DE); Christian Schwingenschlögl, Putzbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 12/225,818

(22) PCT Filed: Jan. 26, 2007

(86) PCT No.: PCT/EP2007/050781

§ 371 (c)(1),
(2), (4) Date: Sep. 30, 2008

(87) PCT Pub. No.: WO2007/113022

PCT Pub. Date: Oct. 11, 2007

(65) Prior Publication Data

US 2009/0232014 A1 Sep. 17, 2009

(30) Foreign Application Priority Data

Mar. 30, 2006 (DE) .................. 10 2006 014 910

(51) Int. Cl.
*G01R 31/08* (2006.01)
(52) U.S. Cl. .................. 370/248; 370/351; 370/238
(58) Field of Classification Search .................. 370/351, 370/229–240, 248, 265, 252; 455/445; 709/238, 709/226, 229
See application file for complete search history.

(56) References Cited

U.S. PATENT DOCUMENTS

| 6,115,462 | A | * | 9/2000 | Servi et al. ............. 379/221.06 |
| 7,296,087 | B1 | * | 11/2007 | Ashwood Smith .......... 709/238 |
| 2005/0185632 | A1 | | 8/2005 | Draves, Jr. |

FOREIGN PATENT DOCUMENTS

| EP | 1617608 A1 | | 1/2006 |
| WO | WO 02073354 | * | 9/2002 |
| WO | WO 02073354 A2 | | 9/2002 |
| WO | WO 2004068870 | * | 8/2004 |
| WO | WO 2004068870 A2 | | 8/2004 |
| WO | WO 2004114706 A1 | | 12/2004 |

OTHER PUBLICATIONS

De Couto et al., A high-throughput Path Metric for Mutli-Hop Wireless Routing Proceedings of the 9th Annual International Conference on Mobile Computing and Networking, MOBICOM 2003, San Diego, CA, Sep. 14-19, 2003, Annual International Conference on Mobile Computing and Networking, New York, NY, ACM, US, Bd. Conf. 9, Sep. 14, 2003, pp. 134-146.

\* cited by examiner

*Primary Examiner*—Ricky Ngo
*Assistant Examiner*—Iqbal Zaidi
(74) *Attorney, Agent, or Firm*—Staas & Halsey LLP

(57) ABSTRACT

A method determines a route in distance value for use in routing protocols. An optimum route is determined for time-critical transmissions such as videotelephony or VoIP. For this purpose, the route distance value is calculated as the product of the link metrics for the links of a route, said link metrics being the product of data packet arrival rates. This value is the optimum value for the route which requires the lowest number of repeated packet transmissions (retransmissions). Optionally, an additional factor can be inserted in the link metrics, which factor ensures that the length of a route is also taken into consideration.

6 Claims, 2 Drawing Sheets

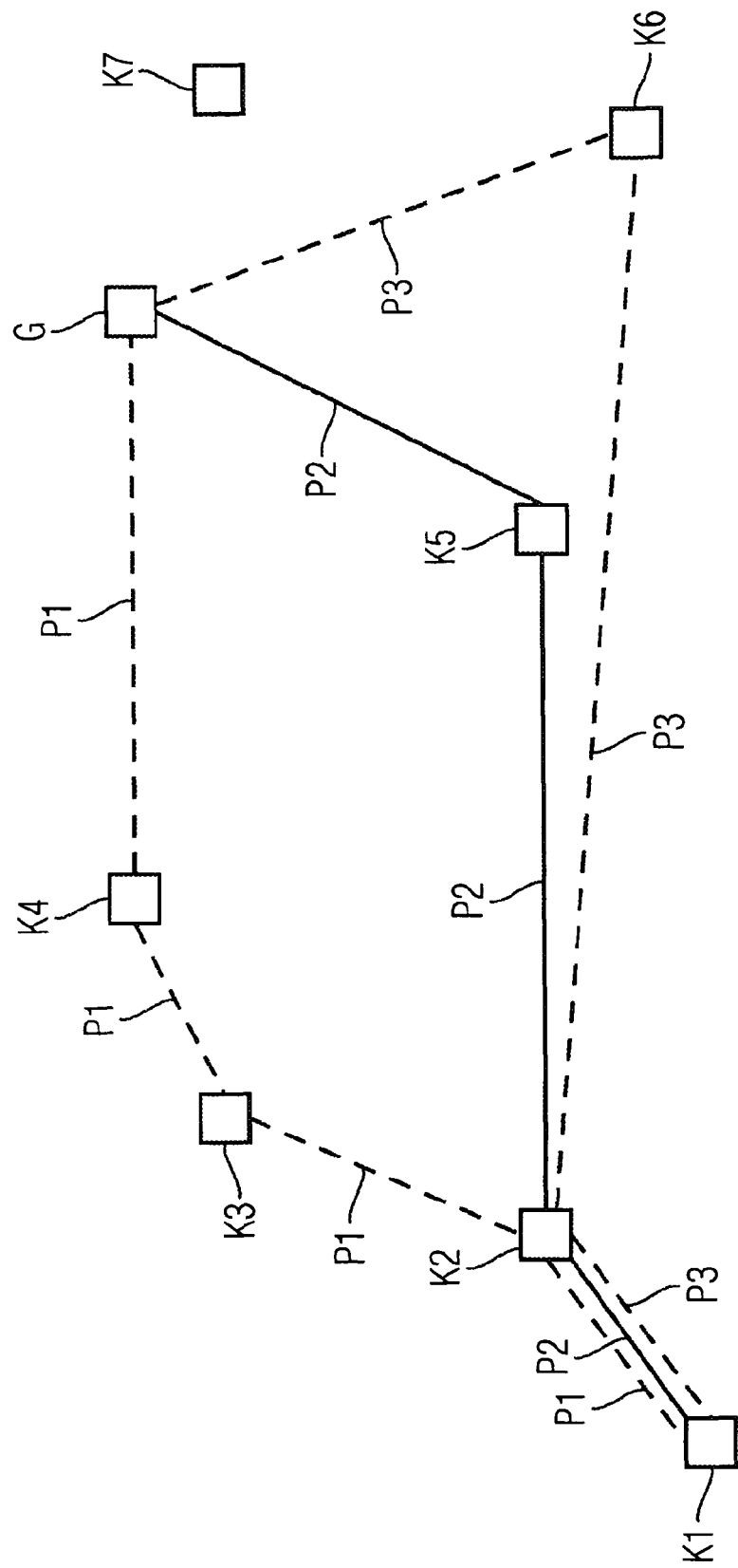

METHOD FOR DETERMINING A ROUTE DISTANCE VALUE

CROSS REFERENCE TO RELATED APPLICATIONS

This application is based on and hereby claims priority to German Application No. 10 2006 014 910.6 filed on Mar. 30, 2006 and PCT Application No. PCT/EP2007/050781 filed on Jan. 26, 2007, the contents of which are hereby incorporated by reference.

BACKGROUND OF THE INVENTION

A network facilitates the transmission of messages between its nodes. In a network not all nodes of the network are directly connected to all other nodes. A message from one transmitting node to a receiving node therefore frequently has to be forwarded via one or several intermediate nodes in order to reach the receiving node from the transmitting node. In this case the route from the transmitting node via the intermediate nodes to the receiving node is described as the path or route.

In order to select a suitable path for a message from a large number of theoretically possible paths in a network, a routing method is used. Firstly, the routing method determines at least one, but usefully a plurality of candidate paths along which the message could be transmitted. In the following, a path distance value, a so-called route metric, is always assigned to a candidate path. The path distance value is a measure of the quality of a candidate path. In turn, the path distance value is usually determined from link distance values which, in turn, are a measure of the quality of individual links of the respective candidate path. In this case a link is described as the direct connection between two nodes of the network.

Utilization costs, for example, can be included in the path distance value for one link of the path or the number of links of a path. Furthermore, it is possible for values for a transmission quality along the candidate path or one link of the candidate path or values for the transmission speed of the candidate path or of one link of the candidate path, to be included. The candidate path with the optimal path distance value is subsequently selected as the path. The message can now be transmitted along this path.

The methods for determining the path distance value are termed routing metrics. A known routing metric is ETX (Expected Transmission Count). The path that is selected by the ETX routing metric is the one where the expected number of transmissions is the lowest. Here transmissions are understood to be initial transmissions (transmissions) as well as repeated transmissions (retransmissions). An initial transmission is the transmission of a packet via a link. A repeated transmission occurs if the first transmission was not successful. The initial transmissions and the repeated transmissions are treated equally by ETX.

However, retransmissions have the disadvantage that they can require more time than initial transmissions. Therefore, for certain types of data transmission in specific scenarios, the disadvantage of ETX is that it does not determine the optimal path. Such data transmissions can be voice over IP (VoIP) or video telephony, for example. Other examples of such types of data transmissions are all types of time-critical data transmissions.

SUMMARY

One potential object is to specify a method for determining a path distance value, as well as a network node which permits or can implement an improved path selection for time-critical data transmissions.

The inventors propose a method for determining a path distance value for a path, in which the path distance value is determined on the basis of a first probability. The first probability indicates the probability that during a transmission along the path, a data packet must be transmitted several times at at least one link of the path. This means that the first probability states the probability that a retransmission is necessary at at least one link. The metric determined by the method has the advantage of facilitating an improved path selection for time-critical data transmissions.

It is useful if the following steps are carried out by the method:
  determination in each case of a link distance value included in the first probability for at least one link of the path;
  determination of the path distance value from the link distance value.

Here it is useful if a link distance value is determined each time for at least two links of the path, preferably for each link of the path. Furthermore, it is useful to determine the path distance value from at least two of the link distance values determined in this way, and preferably from all link distance values determined in this way.

In an advantageous embodiment the number of links of the path is additionally taken into consideration during the determination of the path distance value. This offers the advantage that shorter paths are preferred to longer paths.

In a further advantageous embodiment and development, the link distance value is determined on the basis of a second probability that a data packet will be successfully transmitted during a transmission via the link.

It is preferable if the link distance value is determined for a first transmission direction of the link on the basis of a first data packet arrival rate that is included in the second probability. In a particularly preferred embodiment, the link distance value is additionally or alternatively determined for a second transmission direction of the link that is opposite to the first transmission direction, on the basis of a second data packet arrival rate that is included in the second probability. Here each of the first and second data packet arrival rates basically indicates a frequency at which a message sent via the link in the respective transmission direction is received by its destination.

Preferably, the link distance value is determined on the basis of a first product of the first and second data packet arrival rates. Furthermore, at least two link distance values are preferably determined and the path distance value determined on the basis of a second product of the link distance values.

Usefully, the second product contains an additional factor which is based on the number of links of the path.

The network node has a processing device for determining a path distance value, which processing device is configured in such a way that, for one path, it makes a determination of a path distance value assigned to it, it being possible for the path distance value to be determined on the basis of a first probability that, during a transmission along the path, a data packet must be transmitted several times at at least one link of the path.

The network has at least one such network node.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a schematic network with three candidate paths.

DETAILED DESCRIPTION OF THE PREFERRED EMBODIMENT

Figure 1:
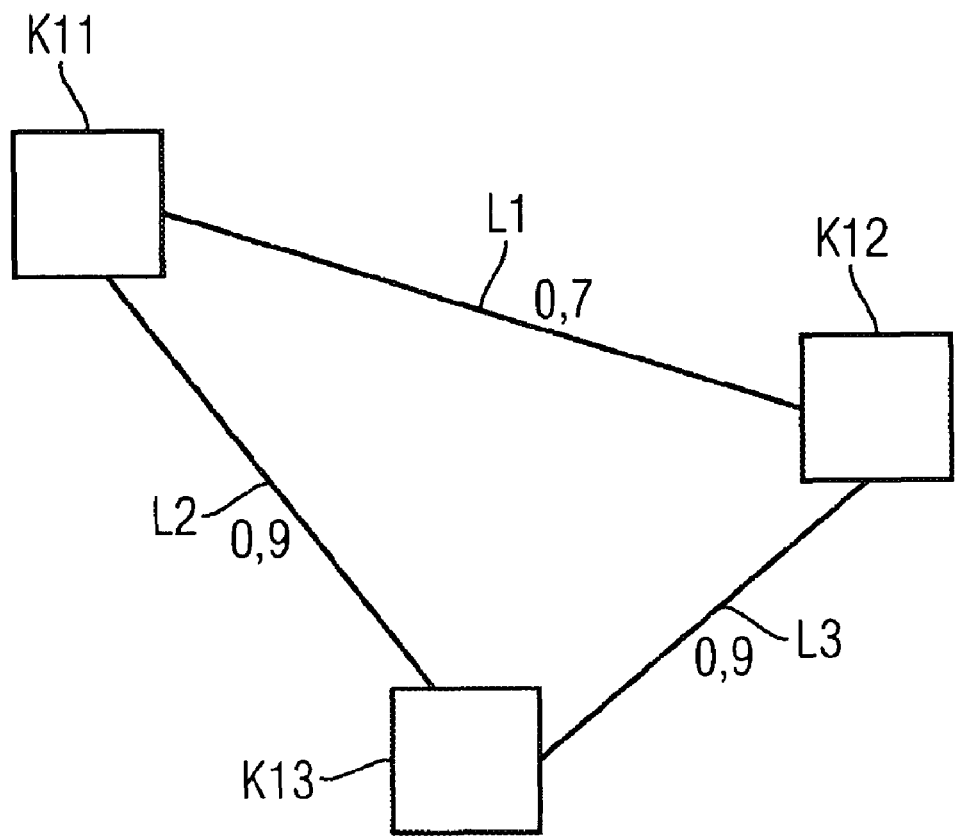
FIG. 1 shows a section of a network having three nodes.

Reference will now be made in detail to the preferred embodiments of the present invention, examples of which are illustrated in the accompanying drawings, wherein like reference numerals refer to like elements throughout. FIG. 1 shows an exemplary network section including an eleventh to a thirteenth node K11 . . . 13. Furthermore, FIG. 1 shows a first link L1 between the eleventh node K11 and the twelfth node K12, a second link L2 between the eleventh node K11 and the thirteenth node K13, and a third link L3 between the twelfth node K12 and the thirteenth node K13. The first link L1 has a link metric of 0.7, whereas the second link L2 and third link L3 each have a link metric of 0.9.

In this exemplary network section, a data transmission from the eleventh node K1 to the twelfth node K2 take place via two possible paths. The first path includes the first link L1. The second path includes the second link L2 and the third link L3. The first path thus runs directly from the eleventh node K1 to the twelfth node K2, whereas the second path runs from the eleventh node K1 via the thirteenth node K3 to the twelfth node K2.

The route metric for a path is calculated in an exemplary embodiment of the routing metric, that is to say the determination of a path distance value for the path, according to the following formula:

$$R = \prod_{Links} LM = \prod_{Links} (D_f \times D_r) \quad (1)$$

where:
R route metric
LM link metric
$D_r$ data packet arrival rate in a first transmission direction
$D_r$ data packet arrival rate in a second transmission direction This means that the route metric is the product of the link metrics, it being possible for the link metrics in turn to be the product of data packet arrival rates of a link for both transmission directions of a link.

In this case the route metric for the first path equals the link metric for the first link L1, that is R=0.7. Here the route metric for the second path equals the product of the link metrics for the second link L2 and the third link L3. This means that the route metric for the second path is R=0.9×0.9=0.81.

The second path therefore has the distinctly lower probability of a retransmission of a data packet in at least one of its links, namely 19%. A routing protocol, which in this exemplary embodiment is based on the routing metric, would in this case select the second path as the path, since this is more suitable for time-critical data transmissions.

In the exemplary routing metric it is possible for a much longer path with a length of 10 links, for example, to have a better route metric than another path with only two links. One of the following formulas is therefore used in further possible exemplary embodiments of the routing metric:

$$R = \prod_{Links} LM = \prod_{Links} (D_f \times D_r \times P) \quad (2)$$

or $$R = \prod_{Links} LM = \left[\prod_{Links} (D_f \times D_r)\right] \times P^{Links-1} \quad (3)$$

where:
P penalty factor
Links number of links

In this case a penalty factor, which usefully lies between 0 and 1, preferably between 0.6 and 0.95 is inserted. In the second formula (2) the penalty factor of the link metric is the multiplier. In the third formula (3) the penalty factor raised to the power of the number of the links of the route metric minus 1 is the multiplier.

In a possible exemplary embodiment of the routing metric as in the second formula (2), P=0.8 is chosen as the penalty factor. The following route metrics are therefore produced for the network section as shown in FIG. 1:

for the first path R=0.7×0.8=0.56
for the second path R=0.9×0.8×0.9×0.8=0.52

In this embodiment of the routing metric the first path would therefore already be given preference over the second path because of the longer length of the second path.

Further variants of the routing metric are given by the following fourth and fifth formulas:

$$R = \prod_{Links} LM = \prod_{Links} (D_r^2 \times P) \quad (4)$$

$$R = \prod_{Links} LM = \left[\prod_{Links} (D_r)\right] \times P^{Links-1} \quad (5)$$

In these variants only the data packet arrival rate is used in the second transmission direction. In one variant this is squared.

It is possible to introduce the penalty factor into the calculation in the various ways shown by the second and third formulas and to mix the various ways of using the data packet arrival rates.

The use of an embodiment of the proposed routing metric in a routing method will now be shown in the following. This is based on the ad hoc network shown in FIG. 2. The ad hoc network contains a first to a seventh node K1 . . . 7 and a gateway G.

In this example the first node K1 wishes to send a message to the gateway G. It is assumed for this example that none of the nodes K1 . . . 7 are aware of a path to the gateway G and therefore such a path must be completely determined.

The routing protocol AODV (Ad hoc On-demand Distance Vector) is used to determine the path. AODV provides for the first node K1 to send a so-called route request message via a broadcast to other nodes in its vicinity. These in turn forward the route request message. A route is determined if the RREQ reaches the destination. This route is sent back via a so-called route reply message and via a unicast to the origin of the route request message, that is to say to the first node K1. At the same time, each node K1 . . . 7, which has received and forwarded the request, has stored the node K1 . . . 7 from which it has received the route request message.

In this example, at the first node K1 three candidate paths P1 . . . 3, along which the message can be transmitted from this node to the gateway G, are produced in this way. Here the first candidate path P1 runs from the first node K1 via the second, third and fourth nodes K2, 3, 4 to the gateway G. The second candidate path P2 runs from the first node K1 via the second and fifth nodes K2, K5 to the gateway G. The third candidate path P3 runs from the first node K1 via the second and sixth nodes K2, K6 to the gateway G. In this example the seventh node K7 does not appear in any of the candidate paths P1 . . . 3.

In order to transmit the candidate paths P1 . . . 3 to the first node K1, route reply messages are now sent back to the first node K1 along the candidate paths. The gateway G therefore sends a route reply message for the first candidate path P1 to the fourth node K4. The latter sends a route reply message to the third node K3, which in turn sends a route reply message to the second node K2, which sends a route reply message to the first node K1.

On receipt of a route reply message, each receiving node K1 . . . 7 determines a route metric for the respective candidate path P1 . . . 3. In this case this relates to the part of the candidate path P1 . . . 3 from the destination, that is to say in this example from the gateway G up to the respective node K1 . . . 7. The route metric is then forwarded in the route reply message, so that the first node K1 can finally determine the entire route metric for each of the candidate paths P1 . . . 3.

In this case, as a routing metric, that is to say as a requirement for determining the quality of a candidate path P1 . . . 3, a route metric is used in which a data packet arrival time is employed as the link metric. This, in turn, is determined by the node K1 . . . 7 from so-called hello messages or metric messages which are sent at regular time intervals. If the fifth node K5, for example, has received the last n of the last m hello messages from the gateway G, then it determines the data packet arrival rate relating to the link between itself and the gateway G as being n/m. The route metric is in turn determined from the link metrics of the link by the product of the link metrics. Here, a penalty factor is included in the product for each link, so that the formula for the route metric is given as:

$$R = \prod_{Links} LM = \prod_{Links} (D \cdot P) \qquad (6)$$

where:
R route metric
LM link metric
D data packet arrival rate
P penalty factor
Links number of links of the candidate path P1 . . . 3

0.8 is used as the penalty factor in this exemplary routing method. Each node K1 . . . 7 that receives a route reply message now compares the route metric of the respective candidate path P1 . . . 3 with a threshold value. In this case the threshold value is to be 0.2. If the route metric of the respective candidate path P1 . . . 3 as determined by a node K1 . . . 7 is below the threshold, then the respective candidate path P1 . . . 3 is rejected. This means that the node K1 . . . 7 no longer sends any route reply message relating to the respective candidate path P1 . . . 3. The result of this is that the rejected candidate path P1 . . . 3 does not reach the first node K1 and therefore cannot also be used for the transmission of the message to the gateway G. The first node K1 itself also compares the route metric of a candidate path P1 . . . 3 transmitted to it via a route reply message, with the threshold value and rejects the candidate path P1 . . . 3 if its route metric reaches or undershoots the threshold.

Finally, the first node K1 selects from the non-rejected candidate paths P1 . . . 3 that candidate path which has the best, that is to say the highest route metric.

The sequence described below results from the stated scheme for the individual candidate paths P1 . . . 3. In each case, exemplary values, which are summarized in the following table, are assumed for the link metrics:

| Link between: | Link metric: |
| --- | --- |
| gateway G, fourth node K4 | 0.8 |
| gateway G, fifth node K5 | 0.9 |
| gateway G, sixth node K6 | 0.6 |
| fourth node K4, third node K3 | 0.7 |
| third node K3, second node K2 | 0.9 |
| second node K2, first node K1 | 0.9 |
| fifth node K5, second node K2 | 1 |
| sixth node K6, second node K2 | 0.5 |

At the first candidate path P1 a route reply message is sent from the gateway G to the fourth node K4. The latter calculates the route metric for the present first path as the product of the link metric for this link and the penalty factor, that is to say 0.8*0.8=0.64. Accordingly, the candidate path P1 is not rejected since its route metric is greater than 0.2. Subsequently, a route reply message goes from the fourth node K4 to the third node K3. The latter calculates the route metric from the product of the previous route metric and the link metric for the link between it and the fourth node K4, as well as the penalty factor, that is to say 0.64*0.8*0.7=0.36. Following a route reply message to the second node K2, the latter calculates the route metric as 0.36*0.8*0.9=0.26. Following the last route reply message, the first node K1 calculates the route metric as 0.26*0.8*0.9=0.19. The first candidate path P1 is therefore rejected at the first node K1 since its route metric at that point is less than 0.2.

Using the same procedure, at the second candidate path P2 route metrics of 0.72, 0.58 and 0.41 are obtained at the fifth, second and first nodes respectively. At the third candidate path P3 route metrics of 0.48 and 0.19 are obtained at the sixth node K6 and the second node K2 respectively. The third candidate path P3 is therefore already rejected at the second node K2 since at that point its route metric is already less than the threshold value of 0.2. The third candidate path P3 therefore does not reach the first node K1.

In this example the first node will therefore select the second candidate path P2 as the only one having a suitable route metric for the transmission of the message to the gateway G.

An alternate embodiment of the routing method is obtained by already transmitting the link metrics with the route request messages. This embodiment of the routing method allows the gateway to make a decision about the path.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for determining a preferred path for data packet transmission among a plurality of candidate paths, each candidate path extending from a transmitting node to a receiving node over one or more links, at least one candidate path extending through at least one intermediate node such that the at least one candidate path has at least two links, comprising:

determining, for each link, a link distance value, each link distance value being determined based on a first probability that a data packet will be successfully transmitted over the respective link, each link distance value being determined for a first transmission direction of the respective link based on a first data packet arrival rate that is included in the first probability and for a second transmission direction opposite to the first transmission direction of the respective link based on a second data packet arrival rate that is included in the first probability;

determining, for each candidate path, a path distance value based on a second probability that, during a transmission along the respective candidate path, a data packet must be repeatedly transmitted over at least one link and the link distance value determined for each of the links;

comparing the path distance value determined for each of the candidate paths with a threshold value; and rejecting a respective candidate path when the path distance value of the respective path is below the threshold value.

2. The method as claimed in claim 1, wherein the link distance values are adjusted based on a first product of the respective first and the second data packet arrival rates.

3. The method as claimed in claim 2, wherein the link distance values are multiplied to produce a second product, and each path distance value is determined based on the second product.

4. The method as claimed in claim 3, wherein the second product contains an additional factor based on the number of links in the respective path.

5. A network node, comprising:
a processing device configured to perform the method of claim 1.

6. A network comprising a plurality of network nodes, each node comprising:
a processing device configured to perform the method of claim 1.

* * * * *